Dec. 18, 1934.  G. SCHOENFELD  1,984,843
TOY
Filed April 17, 1934  2 Sheets-Sheet 1
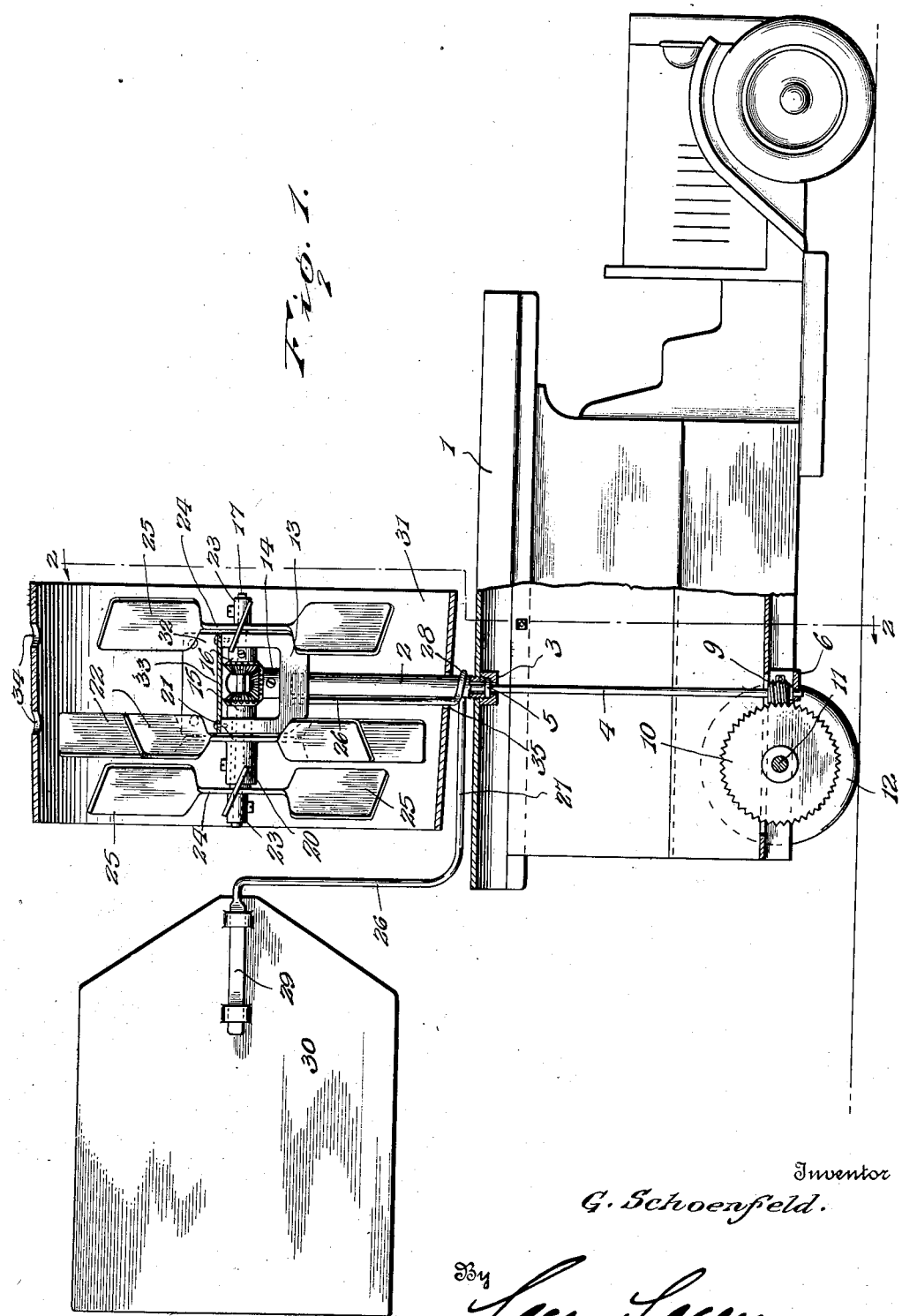
Inventor
G. Schoenfeld.
By Lacey & Lacey,
Attorneys

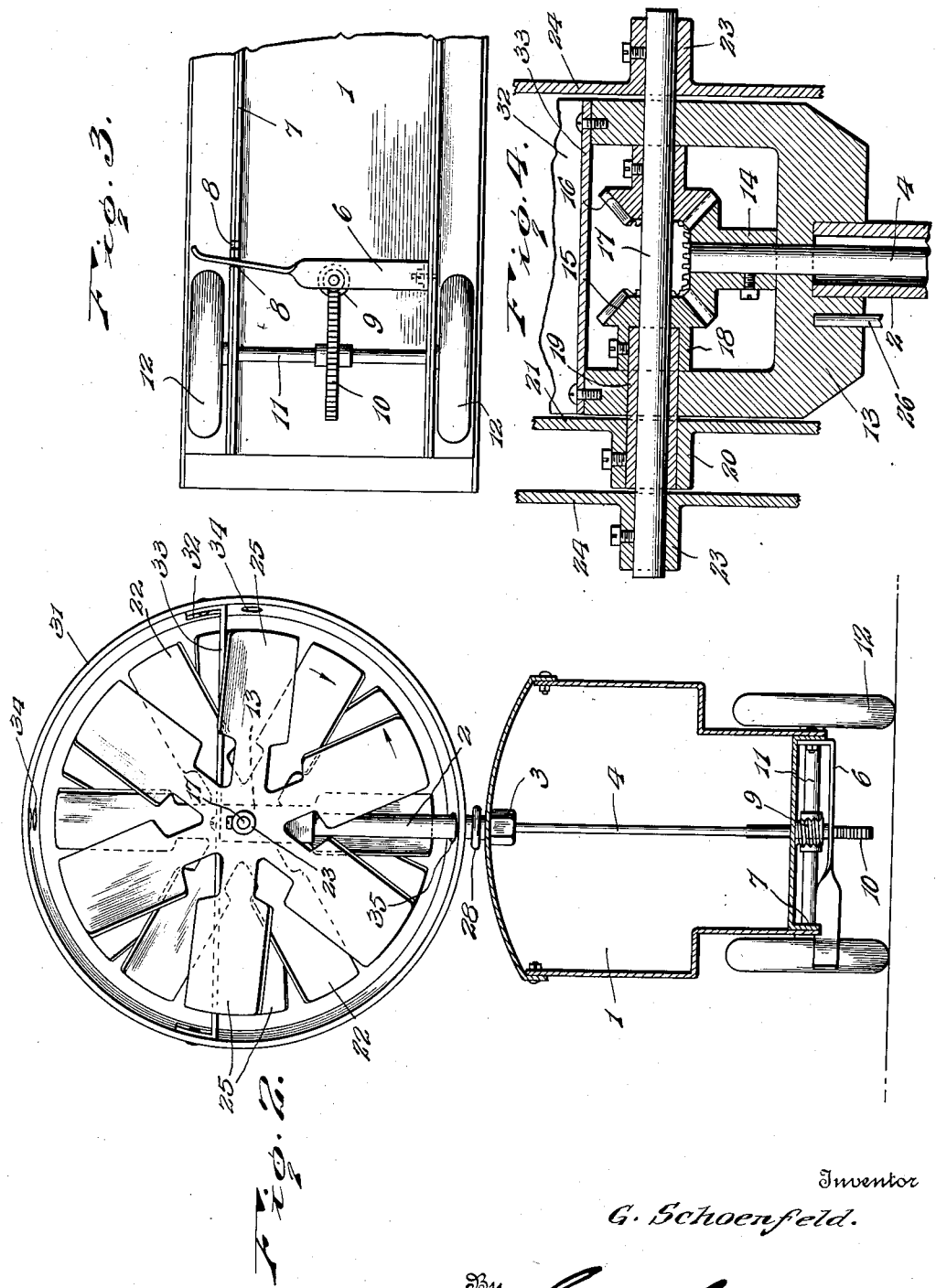

Patented Dec. 18, 1934

1,984,843

UNITED STATES PATENT OFFICE 1,984,843

TOY

Gustav Schoenfeld, Great Falls, Mont.

Application April 17, 1934, Serial No. 721,018

4 Claims. (Cl. 46—48)

This invention relates to toys and has special reference to toys made to represent automobiles, airplanes and other vehicles, the object being to provide a very simple and inexpensive mechanism whereby the toy may be driven or propelled by the force of the wind. The invention is illustrated in the accompanying drawings and will be hereinafter fully described, the novel features being particularly defined in the appended claims.

In the drawings,

Figure 1 is a side elevation, with parts broken away and in section, of a toy automobile having the invention applied thereto.

Figure 2 is a transverse section on the line 2—2 of Figure 1.

Figure 3 is a bottom plan view of a portion of the vehicle,

Figure 4 is an enlarged detail section.

The body of the vehicle 1, in the illustration, is made to simulate an automobile but, as has been stated, the body may represent an airplane or other vehicle. In carrying out the present invention, a supporting tube or hollow post 2 is secured at its lower end in an opening provided in the roof of the vehicle and equipped with a nut 3 whereby it will be firmly anchored. The main shaft 4 is disposed through the post 2 and is provided with an annular rib or enlargement 5 which rests rotatably upon the inner bottom wall of the nut 3, as clearly shown in Figure 1, so that the shaft will be sustained in a vertical position. The lower end of the shaft has a step bearing in a lever 6 which is disposed transversely below the bottom of the vehicle and is pivotally attached at one end thereto, the opposite end of the lever being twisted so that its edge will be presented to the bottom longitudinal flange or rail 7 of the vehicle and engageable in either of two notches 8 in said rail. The lever may be thus swung or sprung toward or away from the rear axle of the vehicle so that a worm 9, fixed on the lower end of the shaft 4, may be caused to engage or disengage the worm gear 10 secured on the rear axle 11 whereby the motion of the shaft will be transmitted to the axle and the wheels 12 caused to propel the vehicle.

The upper end of the post 2 is fitted in a yoke 13 which is free to turn upon the post as a center and the upper end of the shaft 4 extends upwardly through the yoke and is rotatable therein. Immediately above the shoulder or base of the yoke 13 a bevel gear 14 is secured upon the upper end of the shaft, as clearly shown in Figure 4, and this gear meshes with the reversely arranged bevel gears 15 and 16, as shown. The gears 15 and 16 are disposed concentrically about a shaft 17 which extends through the sides of the yoke, and the gear 16 is secured to said shaft so as to rotate therewith, while the gear 15 is loose upon the shaft but has a hub 18 receiving one end of a sleeve 19 which is secured in the hub, as clearly shown in Figure 4. Upon reference to Figure 4, it will be noted that the sleeve 19 is loose upon the shaft 17 and is journaled in one side of the yoke while one end of the shaft is journaled in the opposite side of the yoke. The hubs of the respective gears 15 and 16 abut the side members of the yoke so that relative endwise movement of the shaft and the gears will be prevented and upon the outer end of the sleeve 19 is secured the hub 20 of a propeller which includes a central disk or body 21 and blades 22 which radiate from the body 21 and are disposed obliquely relative to the edge of the body or disk so that air currents impinging upon the blades will effect rotation of the propeller. Other propellers are secured directly upon the shaft 17 at the ends of the same and these propellers consist of hubs 23 which are secured upon the shaft 17, as by set screws shown in Figure 4, and carry, like the first-described propeller, central disks or bodies 24 and blades 25 radiating from the central bodies and disposed obliquely with respect to the edges of the bodies, as will be understood. The blades 25 are reversed relative to the blades 22 and it will be seen at once that air currents impinging upon the blades will drive the gears 15 and 16 in opposite directions but inasmuch as these gears mesh with the gear 14 at diametrically opposite points of the same, the gear 14 and the shaft 4 will be rotated in the proper direction to propel the vehicle.

A bracket consisting of a stout wire or light rod bent to provide a vertical arm 26 and a horizontal arm 27 is disposed adjacent the post 2 and has the upper extremity of its vertical arm secured in the base of the yoke 13, as clearly shown in Figure 1. The two arms 26 and 27 are connected by a bight or eye 28 which encircles the post 2, as shown in Figures 1 and 2, whereby the bracket 27 will be held to the post and may rotate about the post with the yoke. The outer portion of the horizontal arm 27 is turned upwardly beyond the propellers, as shown in Figure 1, and terminates in a laterally extended arm 29 which carries a vane 30. Should the wind be blowing in a direction against the edges of the blades 22, 25, it will obviously be blowing directly against the side of the vane 30 and will, consequently, swing the vane and the parts connected therewith about the post 2 and thereby bring the propellers into such position that their faces will be presented to the wind and, consequently, the propellers will be rotated to impart the desired propelling force to the vehicle, as will be understood. It may be noted that I have shown three propellers mounted upon the driving shaft 17 and two propellers are relatively close together while the inner propeller is at the opposite side of the yoke, but the closer propellers are sufficiently spaced to avoid clashing. While the propellers will rotate in opposite directions, the bevel gearing will transmit all of the power generated to the main shaft at opposite sides of the same so that the shaft will be easily rotated in the desired direction, and the effect upon the eyes of young children will be such as to create an impression of very high power and will also tend to mystify children by reason of the opposite rotation of the propellers, while the vehicle will move in one direction. If the user of the toy desires to permit the propellers to rotate without imparting motion to the vehicle, the supporting lever 6 is shifted from the rear notch 8 to the forward notch 8 and engaged therewith so that the worm 9 will be carried out of mesh with the worm gear 10 and, consequently, the rotation of the shaft 4 will have no effect upon the vehicle. Inasmuch as the device is a toy, the shaft 4 may be sprung to follow the movement of the supporting lever without damaging the mechanism or rendering the same inoperative. It will be readily noted that the structure is such that it permits the use of very light material so that it may be produced at a low cost, which is an essential consideration in the manufacture of toys.

An open-ended hood 31 of circular cross section is provided around to prevent the fingers of children accidentally coming into contact with the rotating propellers and being thereby cut or otherwise injured. The hood is riveted or otherwise firmly secured at opposite points to the upturned flanges 32 of a base plate which bridges the yoke 13 and is secured thereon by screws as shown in Figure 4. The hood is provided at proper points with openings 34 to admit a screwdriver for manipulating the several securing screws, and in its lower side is a larger opening 35 to admit the upper ends of the post 2 and the arm 26. The hood confines the inflowing air to the propellers and it is tapered, as shown in Fig. 1, so as to concentrate the inflowing currents and obtain maximum power therefrom.

Having thus described the invention, I claim:

1. A toy comprising a mobile body, a shaft mounted vertically in the body, gearing at the lower end of the shaft for transmitting rotation of the shaft to wheels on the body, a lever disposed transversely to the body and mounted thereon at one end and supporting the lower end of the shaft, the free end of the lever being engageable in notches provided therefor in the body whereby to engage or disengage the said gearing, and propellers supported at the upper end of the shaft and operatively connected therewith for rotating the same.

2. A toy comprising a mobile body, a hollow post secured in the roof of the body, a shaft extending through said post and rotatable therein, gearing at the lower end of the shaft whereby the rotation of the shaft will propel the body, a yoke rotatably mounted upon the upper end of the post, a shaft extending through the sides of the yoke and rotatable therein, a bevel gear secured on the upper end of the first-mentioned shaft above the base of the yoke, reversely arranged gears mounted upon the second-mentioned shaft and meshing with the first-mentioned gear, one of the last-mentioned gears being secured upon the second-mentioned shaft and the other of the said gears being loose upon said shaft and having a hub encircling the shaft, a plurality of propellers having hubs secured directly upon the second-mentioned shaft, a sleeve fitted around the shaft and secured in the said hub of the reversely arranged gear, and a propeller secured upon the outer end of said sleeve, the blades of the last-mentioned propeller being reversed relative to the blades of the first-mentioned propellers.

3. A toy comprising a mobile body, a post secured in the roof of the body, a shaft extending through said post, means whereby rotation of said shaft will propel the body, a yoke rotatable upon the upper end of the post, a shaft journaled in the sides of the yoke, propellers mounted on said second-mentioned shaft, gearing connecting the second-mentioned shaft with the first-mentioned shaft, a bracket having an arm disposed vertically adjacent the post with one end secured in the yoke and having an eye at its lower end encircling the post, a horizontal arm extending from the eye to a point beyond the propellers and terminating in an upper horizontal arm, and a vane carried by said upper horizontal arm.

4. A toy comprising a mobile vehicle, a main shaft mounted vertically in the vehicle, gearing whereby the rotation of the shaft may be imparted to the vehicle, propellers supported at the upper end of the shaft and geared thereto to be operated by air currents to rotate the shaft, means for holding the propellers in operative relation to the air currents, and a hood housing the propellers.

GUSTAV SCHOENFELD. [L. S.]